United States Patent
Gisin

(10) Patent No.: US 10,473,269 B2
(45) Date of Patent: Nov. 12, 2019

(54) COMPRESSED GAS CANISTER OPENER

(71) Applicant: Yevgeniy Mikhaylovich Gisin, San Leandro, CA (US)

(72) Inventor: Yevgeniy Mikhaylovich Gisin, San Leandro, CA (US)

(*) Notice: Subject to any disclaimer, the term of this patent is extended or adjusted under 35 U.S.C. 154(b) by 0 days.

(21) Appl. No.: 16/276,473

(22) Filed: Feb. 14, 2019

(65) Prior Publication Data
US 2019/0257476 A1 Aug. 22, 2019

Related U.S. Application Data

(60) Provisional application No. 62/633,611, filed on Feb. 22, 2018.

(51) Int. Cl.
| A23P 30/40 | (2016.01) |
| F17C 7/00 | (2006.01) |
| B65B 31/00 | (2006.01) |
| B65B 69/00 | (2006.01) |

(52) U.S. Cl.
CPC ............. *F17C 7/00* (2013.01); *A23P 30/40* (2016.08); *B65B 31/003* (2013.01); *B65B 69/0041* (2013.01)

(58) Field of Classification Search
CPC ........ F17C 7/00; A23P 30/40; B65B 69/0041; B65B 31/003
See application file for complete search history.

(56) References Cited

U.S. PATENT DOCUMENTS

| 2,120,297 A * | 6/1938 | Reinecke ............... A23G 9/20 141/19 |
| 2,190,688 A * | 2/1940 | Snelling ............... B67D 1/0418 141/17 |
| 2,324,648 A * | 7/1943 | Roeder ................. A47J 43/121 222/464.1 |
| 2,360,603 A * | 10/1944 | Ward ..................... B65D 83/75 222/153.04 |
| 2,547,052 A * | 4/1951 | Sollman ............... B67D 1/0418 141/17 |
| 2,765,965 A * | 10/1956 | Reswick ................. A47K 5/12 222/402.15 |
| 2,822,002 A * | 2/1958 | Mack ................... B05B 9/0833 141/17 |
| 3,597,780 A | 8/1971 | Coyle et al. |
| 3,719,232 A | 3/1973 | Gubela et al. |
| 3,999,534 A | 12/1976 | Chapin et al. |
| 4,526,730 A * | 7/1985 | Cochran ............. B01F 3/04801 141/17 |
| 4,650,004 A * | 3/1987 | Wendling ............... A62C 13/74 169/85 |
| 4,867,209 A * | 9/1989 | Santoiemmo ....... B01F 3/04801 141/19 |

(Continued)

FOREIGN PATENT DOCUMENTS

GB 519511 A * 3/1940 ............... A23G 9/20

*Primary Examiner* — Nicolas A Arnett
(74) *Attorney, Agent, or Firm* — Chhabra Law Firm, PC

(57) ABSTRACT

This invention describes a device which attaches to the threaded base connector of a whipped-cream dispenser and which allows for a simple and quick charging of said dispenser using disposable compressed gas canisters. This device allows for safe charging of the dispenser and employs multiple directions of lever operation/movement to provide this safety.

20 Claims, 10 Drawing Sheets

(56) References Cited

U.S. PATENT DOCUMENTS

| | | | |
|---|---|---|---|
| 6,029,645 A | | 2/2000 | Wonisch et al. |
| 6,729,327 B2 | | 5/2004 | McFarland, Jr. |
| 7,100,799 B2 | * | 9/2006 | Gruenewald ......... A47J 43/121 |
| | | | 222/1 |
| 8,191,734 B2 | * | 6/2012 | Lupfer ................ B01F 3/04801 |
| | | | 141/329 |
| 8,336,733 B2 | * | 12/2012 | Laws .................. B01F 15/0205 |
| | | | 141/17 |
| D701,725 S | * | 4/2014 | Wang ............................. D7/369 |
| D814,874 S | * | 4/2018 | Pochtler ......................... D7/590 |
| 2001/0000316 A1 | | 4/2001 | Kawai |
| 2005/0082312 A1 | | 4/2005 | Gruenewald et al. |
| 2008/0017179 A1 | | 1/2008 | Vasel et al. |
| 2008/0168974 A1 | | 7/2008 | Kaminker et al. |
| 2009/0071459 A1 | | 3/2009 | Wenaas et al. |
| 2011/0027354 A1 | | 2/2011 | Kim |
| 2011/0049193 A1 | | 3/2011 | Muller Kubold et al. |
| 2011/0306446 A1 | | 12/2011 | Frank |
| 2016/0075503 A1 | | 3/2016 | Ramsey et al. |
| 2017/0240405 A1 | | 8/2017 | Gibson et al. |
| 2018/0193855 A1 | | 7/2018 | Pochtler |

\* cited by examiner

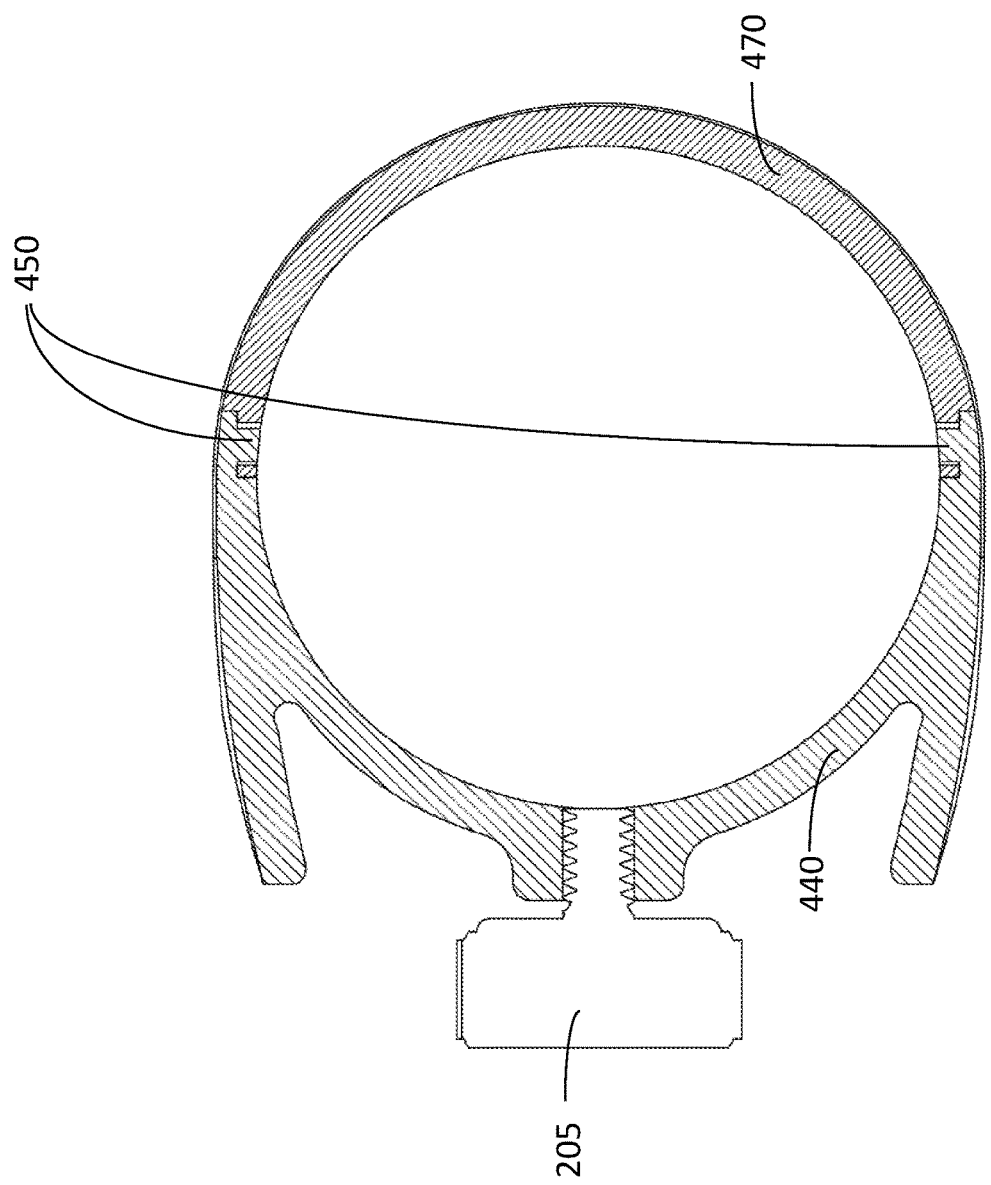

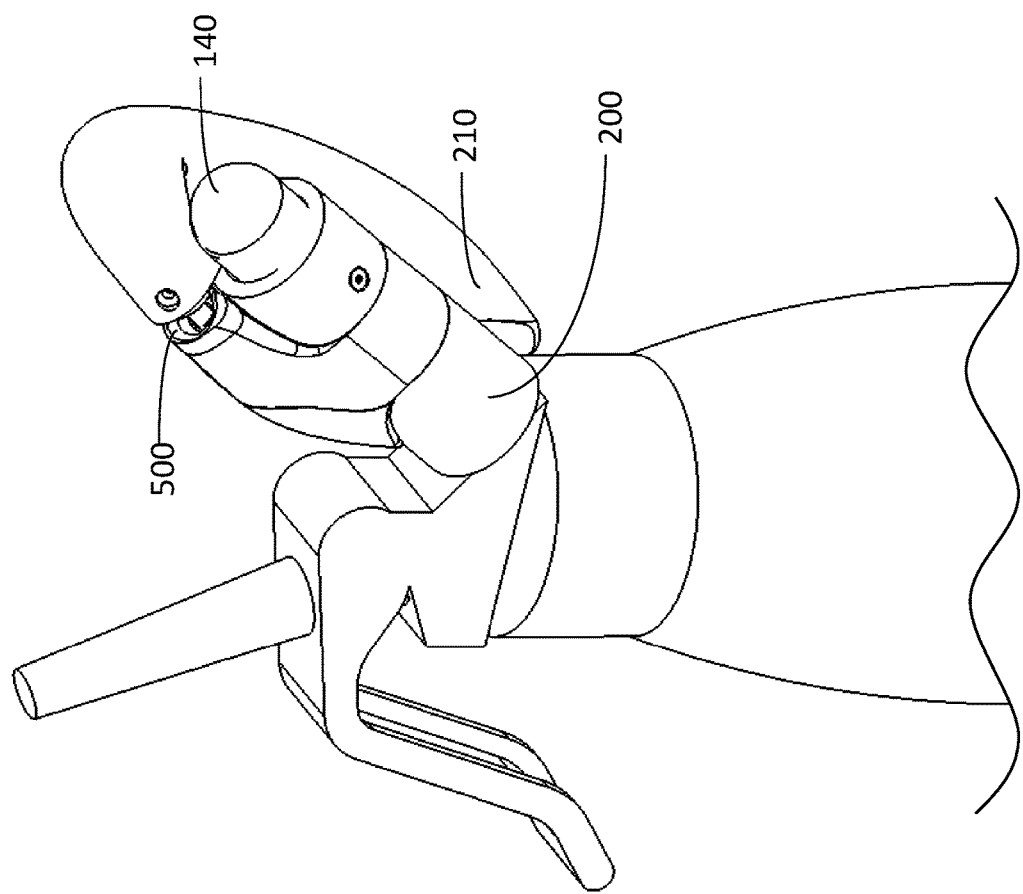

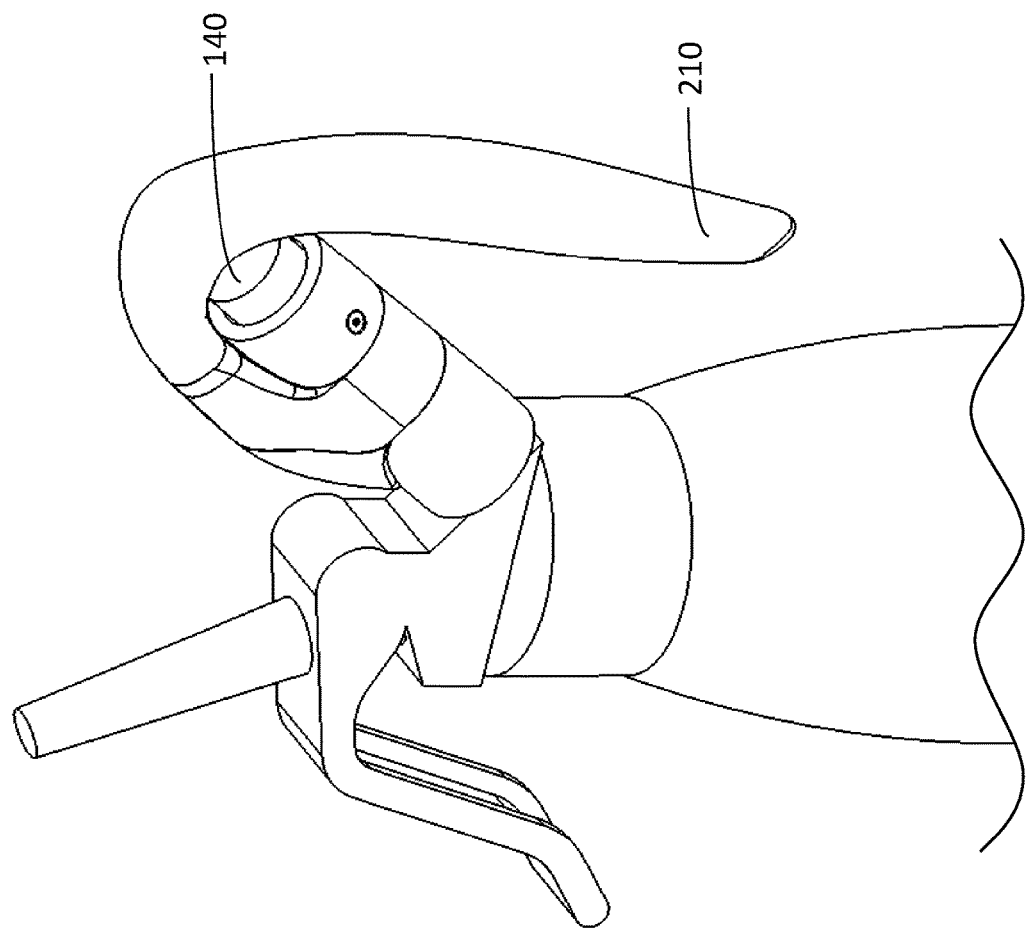

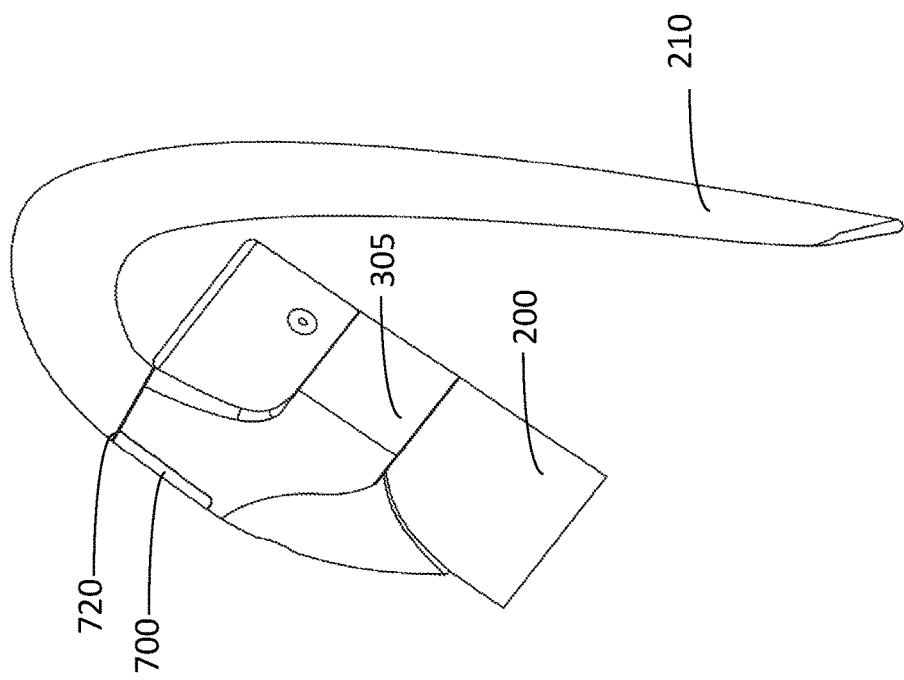

COMPRESSED GAS CANISTER OPENER

BACKGROUND

Field of the Invention

The invention presented is designed to provide for an easier and quicker method of opening compressed gas canisters used for pressurizing food grade dispensers.

Description of the Related Art

The traditionally used method for opening compressed gas canisters (such as, but not limited to, the one-time-use 8 g N2O compressed gas canisters primarily used in the making of whipped cream) employs a container for the canister or cylinder having a screw-threaded end that attaches to the vessel into which the gas will be injected. This container or cap securely retains the gas canister in a position that is coincident with a one-way gas-pressure valve at the top of a whipped-cream dispenser. In use, this screw-threaded cap is first unscrewed from the threaded boss on top of the whipped-cream dispenser. A new, unopened compressed gas canister is placed inside the cap with the neck of the canister having a frangible seal at the same end as the threaded portion. The cap, along with the new gas canister, is then placed back into position so that the cap may be screwed onto the threaded boss on the receiving vessel. As the cap is tightened, it engages the neck of the canister having a frangible seal on the end directly, or first with an optional soft rubber seal to help prevent gas leakage and then subsequently, with a sharp, hardened, hollow metal needle at the center of the dispenser threaded boss. Continued tightening of the cap causes the needle tip to pierce the seal at the end of the canister. The vessel containing the comestible product, such as whipped cream, is initially at a lower pressure than that inside the gas canister so, when the seal is pierced, gas flows from the high pressure canister until the two pressures equalize. The gas flows through a one-way-valve inside the dispenser and this acts as a safety feature allowing the now discharged canister to be removed after discharge without risk of explosive loss of pressure from the larger vessel and the dispenser is now ready for use.

Because the transfer of gas from a charging cylinder requires the laborious process of unscrewing and then reattaching the canister container, each time the dispenser is to be charged, considerable time is lost and one solution is to have two dispensers and a helper to enable a chef or equivalent work quickly and efficiently. It is readily apparent that a need exists for a solution to this problem that allows very quick and easy exchange of a charging cylinder without protracted delay.

SUMMARY

The invention describes a mechanism that reduces the time and effort required to load whipped-cream dispensers with compressed gas canisters. A tube having threads at the lower end and a lever that may be swung to one side at the upper end allows the mechanism to be semi-permanently attached to the dispenser. The tube provides lateral support for the gas cylinder or canister, whilst the lever serves to secure the axial position of the canister and to actuate the gas release. When the lever is displaced to the side, an opening is exposed at the upper end of the tube that allows a gas charging canister to be dropped into the tube which now guides it to the piercing needle. When the lever is returned to the operating position, the gas canister is held captive and subsequent downward pressure on the lever forces the canister into engagement with the hardened hollow needle that pierces the frangible seal on the canister and releases the gas into the dispenser. Following canister discharge, the lever may then be released and displaced to the side, allowing the discharged canister to be removed and a fresh canister inserted and held captive ready for the next charging event.

BRIEF DESCRIPTION OF THE DRAWINGS

FIG. 4c shows the components of FIG. 4b assembled.

FIG. 5 illustrates the process of loading a fresh canister.

FIG. 6 illustrates the operating position of the invention.

DETAILED DESCRIPTION OF THE INVENTION

Figure 1:
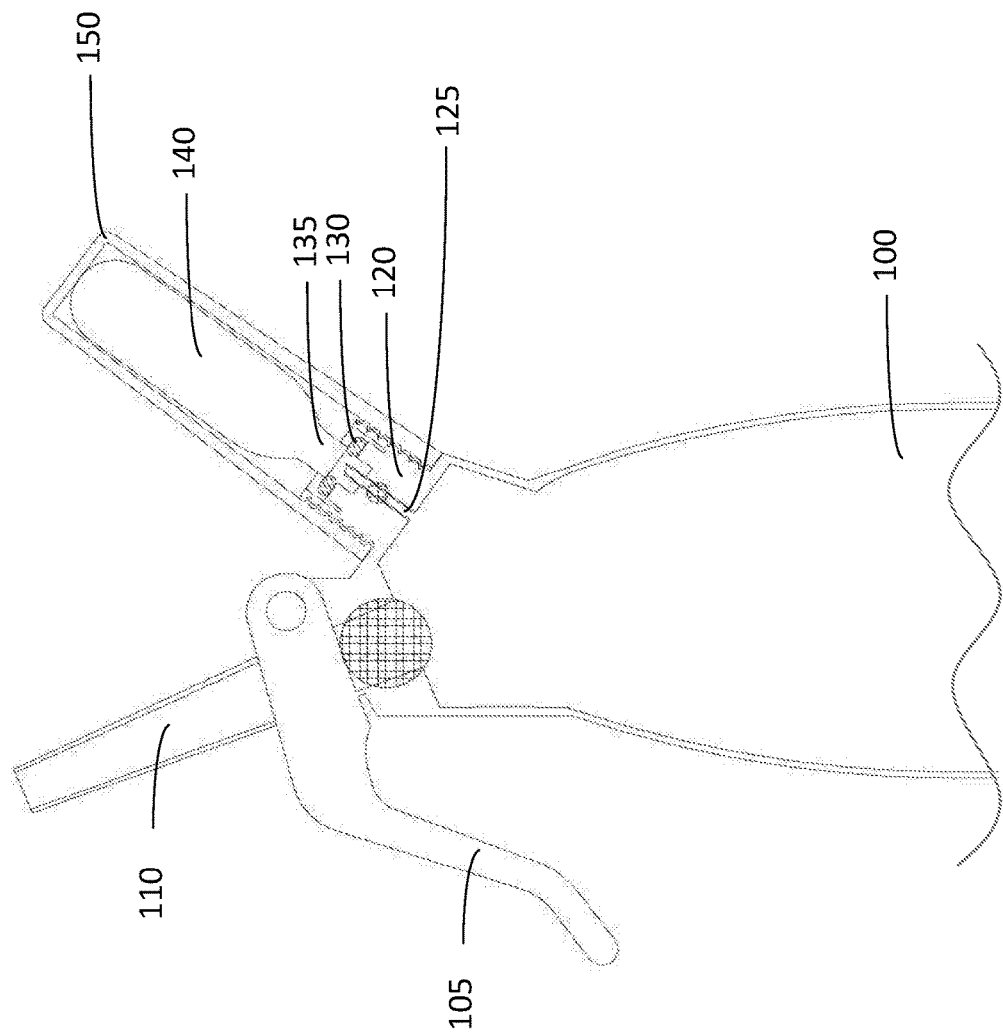
FIG. 1 shows the cross-section view of a typical whipped cream dispenser.

FIG. 1 illustrates a conventional whipped cream dispenser 100. When pressurized, the dispensing lever 105 is depressed and the food or other comestible product is dispensed through nozzle 110 onto a plate, bowl or the contents thereof. This invention is concerned with the mechanism that is used to pressurize the vessel 100 and following the conventional operation of such an appliance will aid in understanding the significant improvement that this invention offers.

A threaded boss 120 is incorporated into the dispensing vessel and within that boss is fitted a hardened hollow needle 125. An optional rubber or synthetic material o-ring 130, or gasket, can be located so that the neck 135 of a compressed gas canister 140 encounters this o-ring and forms a tight seal before a frangible seal at the end of the neck is pierced by hollow needle 125. The frangible seal at the neck of the compressed gas canister may provide sufficient sealing action if the force applied to this seal by the penetrating needle 125 is of sufficiently long duration to discharge the canister to the lowest pressure level and subsequent leakage will be of minor consequence in light of the non-return action of a valve (not shown) at the needle location that prevents discharge from the large volume of the dispenser body. A threaded retainer or cap 150 secures the gas canister 140 and as the cap is threaded onto the vessel's boss 120, this forces the gas canister firmly against the hardened hollow needle which pierces the frangible seal at the neck and releases the gas that is contained in the canister into the vessel. Constant threading and unthreading of the cap onto the boss causes wear and eventually the cap 150 either breaks or must be replaced. Lubrication of these threads is desirable, but risks contamination of the foodstuff contained in the dispensing vessel and so failure of the cap under heavy use is almost inevitable unless it is replaced frequently. Unlike a dispenser in domestic use, commercial appliances are in constant use and breakage of the cap coincident with the release of gas from the canister is a danger to the operator and others in the vicinity since the canister becomes a projectile if released at this time.

Figure 2:
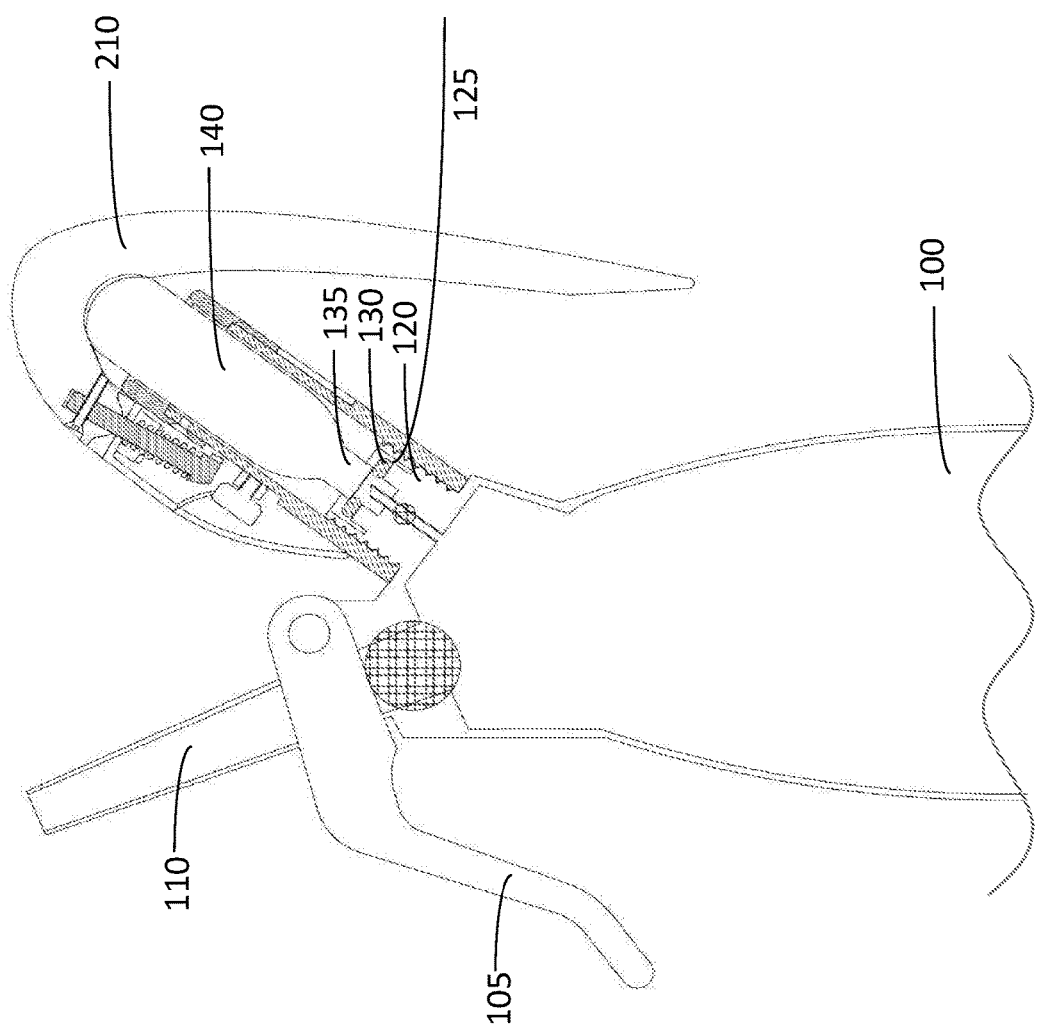
FIG. 2 illustrates the cross-section of the same dispenser with this invention in place.

Turning to FIG. 2, the cap that secures the gas canister in the conventional system shown as 150 of FIG. 1 is replaced by a mechanical assembly 200 that includes a lever system 210. In use, the lever system is depressed so that it pushes, axially, the gas canister 140 into engagement with the needle 125 that punctures the frangible seal in the neck 135 of the canister and discharges the gas into the dispenser body 100. This mechanical assembly 200 is threaded onto the dispenser's screw boss 120 and remains attached to the dispenser body, being removed only for cleaning or other maintenance. The actuating lever 210, in addition to allowing displacement of the gas canister to move the gas charge into the dispenser, can be displaced to the side in a swiveling action so that a replacement gas canister may be fitted. Screw 205 is shown in this figure as being a component that retains a collar fitted in one implementation of this assembly. When the system is manufactured as a single product, this collar adjustment and retaining screw may be permanently replaced with a non-removable fitting such as a pin that locks the collar into a predetermined position.

Figure 3:
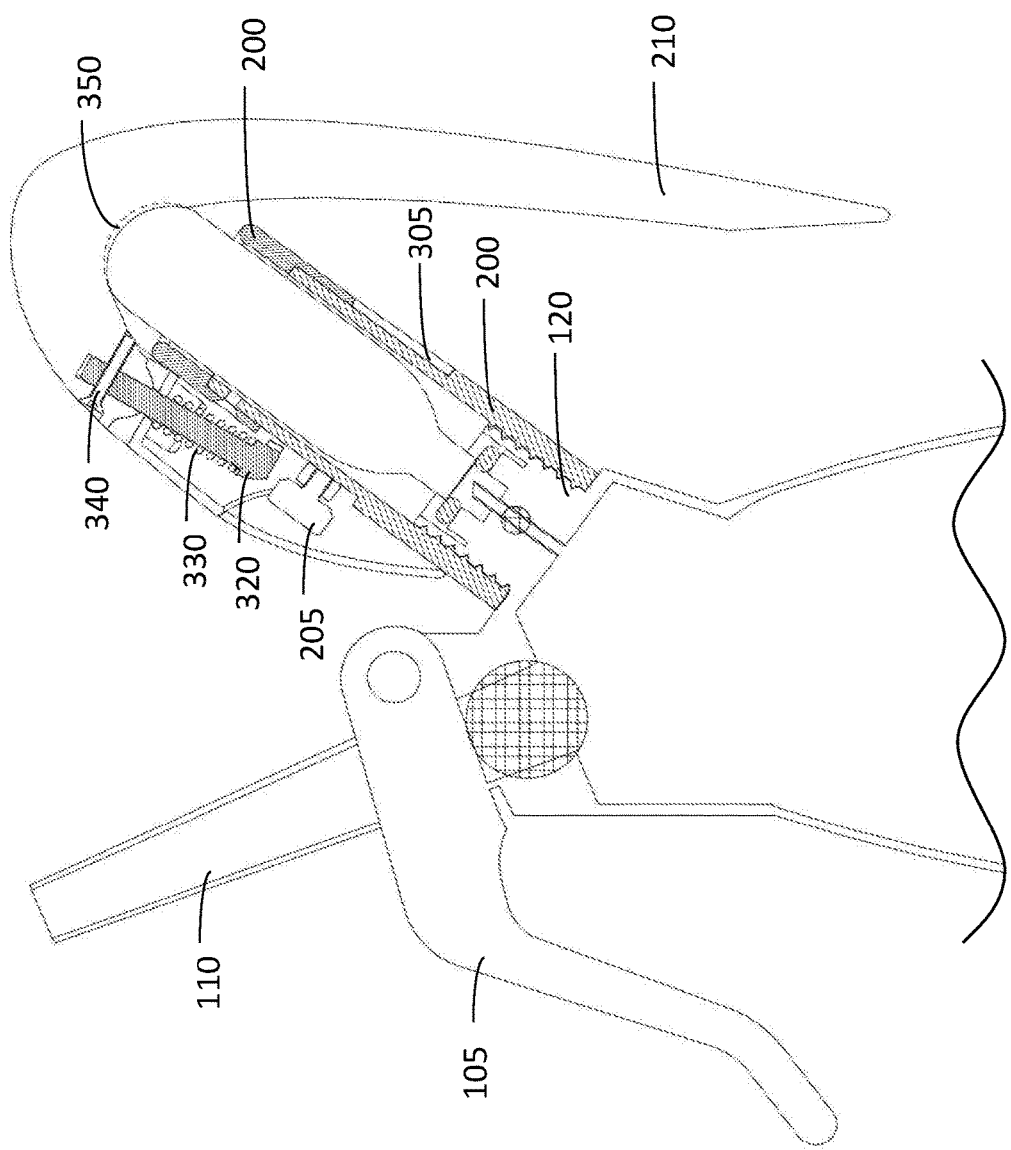
FIG. 3 is a detailed view of the mechanical system.

FIG. 3 illustrates the detail of the mechanical system. The body of the system comprises more than one part. The component 200 that threads onto the screw-boss 120 of the dispenser is threaded on until it is hand tight; because there is no particular indexing to the threaded screw-boss that is part of the dispenser, the position of this component is angularly indeterminate. Accordingly, provision is made so that the component 305 that determines the angular position of the actuating lever 210 in the normal operating position can be adjusted relative to component 200 so that the actuating lever is located to accommodate the user. Once this angular position of the lever relative to the dispenser is established, screw 205 may be tightened so as to secure it against further angular movement. In one implementation, the surface of 200 that lies beneath the component 305 has a knurled finish that provides a more robust friction surface to reduce any tendency for the components to rotate relative to one another. If the entire product is manufactured as a complete unit, then this angular position can be determined at the factory and pinned permanently in place. Component 305 that secures the angular positioning can be either a single part as shown in FIG. 4a, or else made in two parts that may be snapped together so that they surround the body 200 as shown in FIG. 4b.

The actuating lever 210 is attached to the movable component 305 that establishes the angular position of the lever relative to the dispenser's threaded boss, within which the gas canister penetration needle is located. This attachment may be done in several ways, but in a preferred implementation, a locating pin 320 is passed through a hole in the movable component 305 and into the base of the lever 210 and thence secured with a pin 340. Lever tension is assured by using a spring 330 that is placed over the locating pin 320 so that it bears against a shoulder on the locating pin and the inside wall of the hole in the movable component 305. Lever 210 may now be rotated about the axis of the locating pin and may be displaced axially, along the axis of the canister, opposed by spring tension due to spring 330. Motion of the lever is limited in use by simple mechanical restraints in rotation and spring tension, axially. In one implementation, matching ramp shapes are created on the lever and the mounting point through which the locating pin passes so that rotational motion forces the lever to climb the ramp against spring tension. A machined step or similar obstruction can be used as a hard stop to prevent over rotation in a manner well known in the art.

An important aspect of the invention is the use of a machined or cast concavity 350 in the lever 210 that allows a gas canister to be located securely using only the spring tension delivered by the spring 330 that is fitted at the locating pin 320. Once pressure is applied to the lever to actuate the release of gas pressure from the canister, this concavity limits sideways motion of the lever and ensures that an inadvertent release of the canister will not occur. Once the canister is pushed all the way to the seat of the penetrating needle, then further pressure applied to the lever simply causes the lever to pull the locating pin 320 against spring 330 pressure until the lever can be moved no further.

Figure 4A:
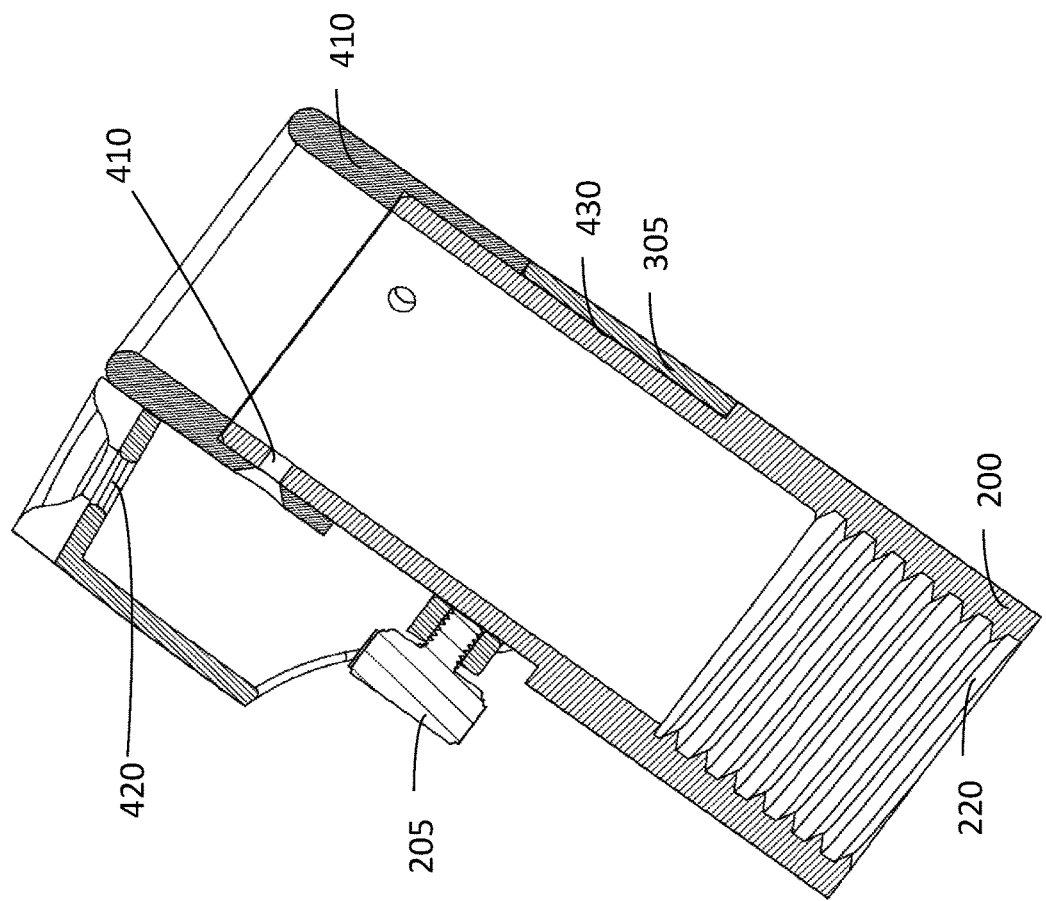
FIG. 4a illustrates a preferred way of fabricating the mechanical system.
Figure 4B:
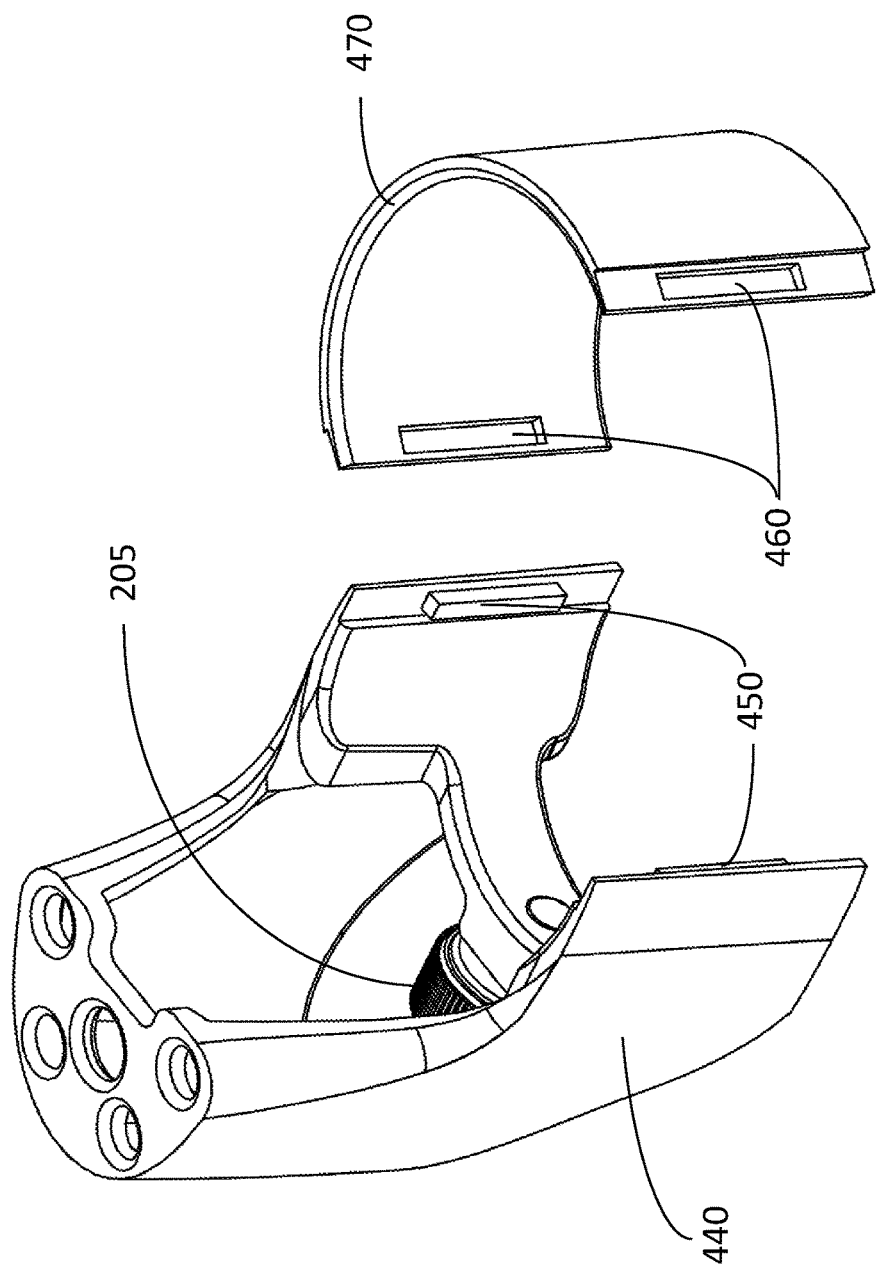
FIG. 4b illustrates a second assembly method for the system.

FIG. 4a shows the part of the mechanical assembly that allows the mechanism to be attached to the dispenser screw-boss and positioned so that the operating lever of the mechanism is conveniently operable by the user. Component 200 is a hollow tubular component having a thread 220 machined at one end so that it may be secured to the screw-boss of the dispenser. A section of this part can be optionally knurled or otherwise rendered as a high friction surface 430 for component 305 to be attached with minimal angular compliance. The component of the assembly 305 that secures the actuating lever 210 is positioned over part 200 and a restraining collar 410 is positioned above it. In one implementation, screw 405 prevents further movement of this collar; although not required, one or more spacing washers can be used to ensure that the collar 410 does not bind on the lever locating component 305. In a second implementation, collar 410 is staked over component 200 after component 305 is installed and requires no further retention. Component 305 may be adjusted for angular position relative to the part 200 that is screwed to the dispenser boss and then secured by tightening screw 205. The hole through which the lever securing pin 320 is inserted is shown at 420 for completeness.

FIG. 4b illustrates a two part assembly that can be used to build the mechanical mechanism that attaches the actuating lever to the dispenser. Here, half-collar 440 is part of the assembly to which the actuating lever mechanism is attached (not shown to aid clarity). In one implementation, the extremities have pegs 450 that can be engaged with matching holes 460 in the opposing part. The opposing half-collar 470 has these locating holes 460 at its extremities and the two half collars are snapped together to form a continuous ring around the threaded component 200 that engages the screw-boss of the dispenser. In this case, the retaining collar 410 and its securing screw 205 are not separately required and may be a machined feature of the threaded component. Depending on the materials selected for the system, any finish that creates a high friction surface for the moving part may be used and screw 205 is tightened to secure the mechanism once the actuating lever is positioned. It should be clear to persons having ordinary skills in the art that other systems for attaching two half-collars may be used to the same effect.

FIG. 4c shows how the two halves 440 and 470 are assembled so as to form a continuous collar that can be installed so as to be axially captive on component 200 without requiring a collar 410 as a separate assembly step.

FIG. 5 shows the system operation, where a gas canister 140 is loaded into the mechanism 200 by first displacing the actuating lever 210 in either direction (shown counter clockwise in this figure) so as to allow the canister to be dropped into the exposed tubular part 200. Pushing the lever aside in this way causes the lever to rotate about the locating pin 320 of FIG. 3. If the lever and the matching seat where the locating pin passes through the mounting assembly are at an angle relative to the pin's axis, this creates a ramp effect and the rotation causes the lever to rise against spring tension, opening a gap 500. If this rotation were continued, the lever would simply experience increasing resistance until the spring binds and it can no longer be moved. In another implementation, a sleeve is fitted over the locating pin 320 so that the spring lies outside this sleeve. Now, when the lever is rotated into the loading position, the sleeve limits the displacement along the axis of the locating pin and acts as a hard stop rather than binding the coils of the spring. In yet another implementation, pin 320 has the boss that the spring rides against formed so that it interferes with the housing element of component 305 and acts as a hard stop for lever displacement, applying this limit force as a torsion through the locating pin 320. It should be clear that prevention of excessive travel of the lever may be achieved in other ways and this aspect is an aid to safety and correct operation of the device. Once the entry-way for the canister is exposed, the canister may be dropped in with the neck of the canister down wards towards the hardened needle at the dispenser end of the assembly and the lever pulled back into the resting position, but against some extra force caused by having to pull it over the dome at the base of the canister. Spring tension is set to be sufficiently low to allow the lever to do this, until the base of the canister is snugly contained in the concavity 350 of the lever.

FIG. 6 illustrates the loaded appearance of the dispenser. The canister 140 rests in the concavity at the crook of the lever 210 and depression of the lever 210 will force the canister down into the mechanism until it encounters the penetration needle and discharges the contained gas. During this process, there will be some movement of the lever attachment point along the axis of the locating pin against spring pressure. Although the lever may be released at any time, even if only a partial discharge has occurred from the gas canister, the concavity 350 of the lever will retain the canister, avoiding accidental release of the canister, though there may be some leakage of gas as the canister tries to move axially away from the needle. To remove the canister in this partially discharged condition, a deliberate effort must be made to rotate the lever as when loading the canister. Once the lever has been displaced to one side, the used canister may be removed and a replacement quickly installed.

Figure 7B:
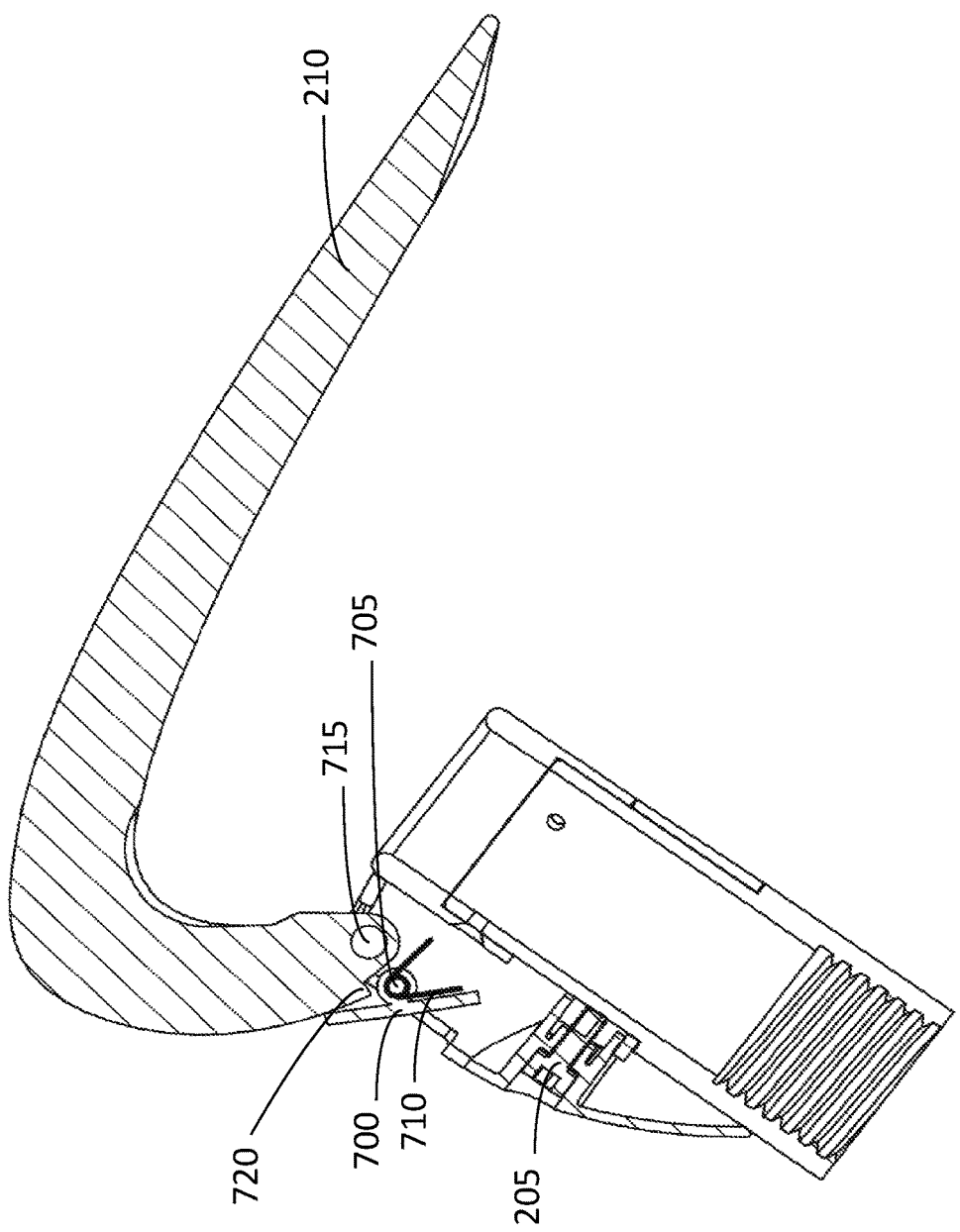
FIG. 7 shows an alternative implementation of the invention.

In an alternative implementation, instead of constraining the lever that compresses the gas canister against the penetrating needle to displace laterally, the actuating lever is hinged so as to displace more or less in the plane of the canister. FIG. 7 illustrates this. In the operating position, lever 210 in FIG. 7a is shown in the down position. A displaceable latch 700 prevents the lever from being opened and is held in this position by a spring. To open the lever so that a canister may be loaded, positive pressure is applied to this latch so as to move it from engagement with the lever and allow the lever to be pivoted up and away from the canister housing 200. As described previously, the lever position in relation to the housing 200 and, by inference, the dispenser, is set by the lever mount 305. Looking now at FIG. 7b, screw 205 is the securing screw that holds mount 305 fixed relative to the canister housing. Displaceable latch 700 is shown in the open position, pivoted around, for example a pin 705 against a force exerted by a hairspring 710 or its equivalent. The lever 210 pivots around a pivot 715 and when the lever is closed to the position shown in FIG. 7a latch 700 engages under spring pressure with a notch or similar feature 720 so as to preclude accidental release of the lever to the open position should the operator release the lever part way through the discharge cycle of the gas canister.

The invention claimed is:

1. A mechanical assembly for pressurized dispensing vessels, comprising:
   an actuating lever system comprising a lever;
   a hollow tubular component housing a compressed gas canister, wherein the compressed gas canister comprises a neck; and
   a mounting component, wherein the mounting component mounts the actuating lever system to the hollow tubular component;
   wherein the lever rotates about the mounting component, or a portion thereof, and
   wherein depression of the lever causes the compressed gas canister to engage with an apparatus of a dispensing vessel that serves to puncture a seal in the neck of the compressed gas canister, thereby releasing gas from the compressed gas canister, and thereby pressurizing the dispensing vessel.

2. The mechanical assembly of claim 1, wherein the hollow tubular component is threaded onto a screw boss of the dispensing vessel.

3. The mechanical assembly of claim 1, wherein the mechanical assembly is integral with body of the dispensing vessel.

4. The mechanical assembly of claim 1, wherein the actuating lever system includes a concavity allowing the hollow tubular component to be seated securely within the mounting component, thereby preventing the actuating lever system from slipping off the hollow tubular component.

5. The mechanical assembly of claim 1, wherein rotating the actuating lever system enables the compressed gas canister to be mounted into, or removed from, the hollow tubular component.

6. The mechanical assembly of claim 5, wherein the actuating lever system further comprises a locating pin, a spring over the locating pin, and a locking pin, wherein the lever rotates about the locating pin.

7. The mechanical assembly of claim 6, wherein depression of the lever causes the locating pin to be pulled against the spring, compressing the spring, thereby providing a limit to range of lever depression.

8. The mechanical assembly of claim 5, wherein a hard stop prevents excessive rotation of the actuating lever system.

9. The mechanical assembly of claim 1, wherein the hollow tubular component includes a tightening screw that secures the mounting component.

10. The mechanical assembly of claim 1, wherein the hollow tubular component includes a high friction surface that serves to retard angular movement of the mounting component.

11. The mechanical assembly of claim 1, wherein the hollow tubular component includes a restraining collar that serves to retain the mounting component on the hollow tubular component.

12. The mechanical assembly of claim 1, wherein the mounting component comprises two joinable half-collar sections.

13. A mechanical assembly, comprising:
   means for actuating a lever;
   means for housing a compressed gas canister, wherein the compressed gas canister comprises a neck; and means for mounting the means for actuating the lever to the means for housing the compressed gas canister;

wherein the lever rotates about the means for mounting the means for actuating the lever to the means for housing the compressed gas canister, or a portion thereof, and wherein depression of the lever, through the means for actuating the lever, causes the compressed gas canister to engage with an apparatus of a dispensing vessel that serves to puncture a seal in the neck of the compressed gas canister, thereby releasing gas from the compressed gas canister, and thereby pressurizing the dispensing vessel, wherein the dispensing vessel is coupled to the mechanical assembly.

14. The mechanical assembly of claim 13, wherein the means for housing the compressed gas canister is threaded onto a screw boss of the dispensing vessel.

15. The mechanical assembly of claim 13, wherein the mechanical assembly is integral with body of the dispensing vessel.

16. The mechanical assembly of claim 13, wherein the means for actuating the lever includes a concavity allowing the means for housing the compressed gas canister to be seated securely within the means for mounting the means for actuating the lever to the means for housing the compressed gas canister, thereby preventing the means for actuating the lever from slipping off the means for housing the compressed gas canister.

17. The mechanical assembly of claim 13, wherein rotating the means for actuating the lever enables the compressed gas canister to be mounted or removed into the means for housing the compressed gas canister.

18. The mechanical assembly of claim 13, wherein the means for housing the compressed gas canister comprises a means to secure the means for mounting the means for actuating the lever to the means for housing the compressed gas canister.

19. The mechanical assembly of claim 13, wherein the means for housing the compressed gas canister includes a means to retard angular movement of the means to mount the means for actuating the lever to the means for housing the compressed gas canister.

20. The mechanical assembly of claim 13, wherein the means for housing the compressed gas canister includes a means to retain the means for actuating the lever to the means for housing the compressed gas canister on to the means for housing the compressed gas canister.

* * * * *